US011456473B2

(12) United States Patent
Shintani et al.

(10) Patent No.: US 11,456,473 B2
(45) Date of Patent: Sep. 27, 2022

(54) REFORMER, CELL STACK APPARATUS, FUEL CELL MODULE, AND FUEL CELL APPARATUS

(71) Applicants: KYOCERA CORPORATION, Kyoto (JP); DAINICHI CO., LTD., Niigata (JP)

(72) Inventors: Shunsuke Shintani, Kirishima (JP); Naruto Takahashi, Kirishima (JP); Norihisa Shibasaki, Niigata (JP); Naoki Yokoo, Niigata (JP)

(73) Assignees: KYOCERA CORPORATION, Kyoto (JP); DAINICHI CO., LTD., Niigata (JP)

( * ) Notice: Subject to any disclaimer, the term of this patent is extended or adjusted under 35 U.S.C. 154(b) by 184 days.

(21) Appl. No.: 16/309,503

(22) PCT Filed: Jun. 13, 2017

(86) PCT No.: PCT/JP2017/021877
§ 371 (c)(1),
(2) Date: Dec. 13, 2018

(87) PCT Pub. No.: WO2017/217433
PCT Pub. Date: Dec. 21, 2017

(65) Prior Publication Data
US 2019/0245229 A1  Aug. 8, 2019

(30) Foreign Application Priority Data

Jun. 16, 2016  (JP) .............................. JP2016-120264
Jun. 16, 2016  (JP) .............................. JP2016-120265
Mar. 31, 2017  (JP) .............................. JP2017-072089

(51) Int. Cl.
*H01M 8/0612* (2016.01)
*C01B 3/38* (2006.01)
(Continued)

(52) U.S. Cl.
CPC ............ *H01M 8/0618* (2013.01); *C01B 3/38* (2013.01); *H01M 8/04201* (2013.01);
(Continued)

(58) Field of Classification Search
CPC ............ H01M 8/0618; H01M 8/0625; H01M 8/0631; B01J 19/0053; B01J 19/006;
(Continued)

(56) References Cited

U.S. PATENT DOCUMENTS 3,785,779 A * 1/1974 Li ..................... B01F 23/23123
422/231
2003/0031901 A1* 2/2003 Breuer ..................... C01B 3/26
429/423

(Continued)

FOREIGN PATENT DOCUMENTS

CN  1661841 A  8/2005
EP  2639871 A1  9/2013

(Continued)

*Primary Examiner* — Edward J. Schmiedel
(74) *Attorney, Agent, or Firm* — Viering, Jentschura & Partner MBB

(57) ABSTRACT

A reformer of the present disclosure includes a reformer body having a cylindrical shape that carries out a reforming reaction by a raw fuel gas and water supplied thereto, the reformer body including therein a vaporization portion which generates steam and a reforming portion which reacts the steam generated in the vaporization portion with the raw fuel gas to generate a reformed gas, at least one of a convex portion and a rough portion having a higher degree of surface roughness than that of other portions, being disposed on at least one of an inner circumferential surface and an outer circumferential surface of the reformer body.

19 Claims, 14 Drawing Sheets

(51) Int. Cl.
*H01M 8/12* (2016.01)
*H01M 8/2483* (2016.01)
*H01M 8/04082* (2016.01)
*H01M 8/2475* (2016.01)

(52) U.S. Cl.
CPC ............ *H01M 8/0612* (2013.01); *H01M 8/12* (2013.01); *H01M 8/2475* (2013.01); *H01M 8/2483* (2016.02); *C01B 2203/0233* (2013.01); *C01B 2203/066* (2013.01); *Y02P 70/50* (2015.11)

(58) Field of Classification Search
CPC ....... B01J 19/2415; B01J 2219/00761–00777; B01J 2219/1943
See application file for complete search history.

(56) References Cited

U.S. PATENT DOCUMENTS

| | | | |
|---|---|---|---|
| 2004/0025784 A1* | 2/2004 | Kawamura | C01B 3/323 117/200 |
| 2004/0115494 A1 | 6/2004 | Tamura et al. | |
| 2004/0136883 A1* | 7/2004 | Buxbaum | B01D 53/22 422/600 |
| 2005/0191533 A1 | 9/2005 | Kim et al. | |
| 2006/0213369 A1 | 9/2006 | Edlund et al. | |
| 2007/0190373 A1* | 8/2007 | Park | H01M 8/0228 72/46 |
| 2008/0244973 A1 | 10/2008 | Higashino | |
| 2010/0330445 A1* | 12/2010 | Fischel | C01B 3/40 422/209 |
| 2013/0122400 A1* | 5/2013 | Kwon | H01M 8/004 429/497 |
| 2016/0023899 A1* | 1/2016 | Hirakawa | C01B 3/38 422/162 |
| 2017/0200960 A1* | 7/2017 | Korsgaard | H01M 8/04022 |

FOREIGN PATENT DOCUMENTS

| | | |
|---|---|---|
| JP | S62270403 A | 11/1987 |
| JP | H06503201 A | 4/1994 |
| JP | 2005243642 A | 9/2005 |
| JP | 2006282424 A | 10/2006 |
| JP | 2007528340 A | 10/2007 |
| JP | 2008007349 A | 1/2008 |
| JP | 2010238444 A | 10/2010 |
| JP | 2011096604 A | 5/2011 |
| JP | 2011210631 A | 10/2011 |
| JP | 2012-009205 A | 1/2012 |
| JP | 2012054016 A | 3/2012 |
| JP | 2013-073899 A | 4/2013 |
| JP | 2013-146704 A | 8/2013 |
| JP | 2013155051 A | 8/2013 |
| JP | 2013191313 A | 9/2013 |
| JP | 2014010896 A | 1/2014 |
| JP | 2014049305 A | 3/2014 |
| JP | 2015-189610 A | 11/2015 |
| WO | 9210009 A2 | 6/1992 |
| WO | 2005073126 A1 | 8/2005 |
| WO | 2005080258 A1 | 9/2005 |
| WO | 2009119616 A1 | 10/2009 |
| WO | 2014002468 A1 | 1/2014 |

* cited by examiner

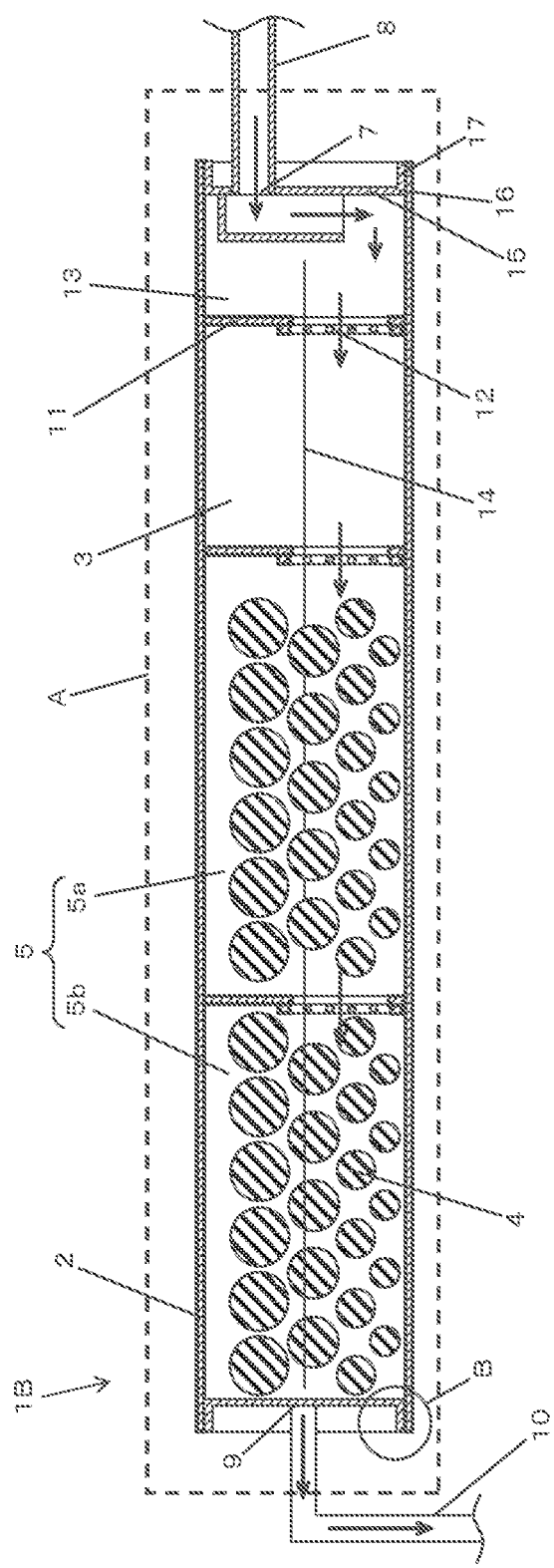

REFORMER, CELL STACK APPARATUS, FUEL CELL MODULE, AND FUEL CELL APPARATUS

CROSS-REFERENCE TO RELATED APPLICATIONS

This application is a national stage entry according to 35 U.S.C. 371 of PCT Application No. PCT/JP2017/021877 filed on Jun. 13, 2017, which claims priority to Japanese Application Nos. 2016-120265 filed on Jun. 16, 2016, 2016-120264 filed on Jun. 16, 2016, and 2017-072089 filed on Mar. 31, 2017, which are entirely incorporated herein by reference.

TECHNICAL FIELD

The present disclosure relates to a reformer for generating a fuel gas to be supplied into a fuel cell, a cell stack apparatus including the reformer, a fuel cell module, and a fuel cell apparatus.

BACKGROUND

In recent years, as next-generation energy, various proposals have been made for a fuel cell module in which a fuel cell capable of obtaining electric power by using a reformed gas (a fuel gas, in other words, a hydrogen-containing gas) and air (oxygen-containing gas) is housed in a housing and a fuel cell apparatus in which the fuel cell module is housed in an exterior case. As a fuel cell, a solid oxide fuel cell in a hollow flat plate shape having a gas passage through which the reformed gas flows in a longitudinal direction thereof is mentioned, in which a fuel-side electrode layer, a solid electrolyte layer, and an oxygen-side electrode layer are disposed on the surface of a support in this order. The fuel cell module is constructed by housing a fuel cell stack in which a plurality of fuel cells are arranged in a housing and is operated to generate power at a temperature of about 600° C. to 1000° C.

Here, a hydrogen-containing gas is used as the reformed gas for power generation, and by supplying a hydrogen-containing gas and an oxygen-containing gas (usually air is used) to the fuel cell, bringing the oxygen-containing gas into contact with an oxygen electrode of the fuel cell and bringing the hydrogen-containing gas into contact with a fuel electrode of the fuel cell, a predetermined electrode reaction occurs and power generation is performed. Therefore, in generating the hydrogen-containing gas to be supplied to the fuel cell, for example, a steam reforming method for generating a reformed gas which is a hydrogen-containing gas by reforming a hydrocarbon such as natural gas with steam is discussed and various reformers for performing such reforming have also been discussed (see, for example, International Publication WO 2009/119616 A1 (Patent Literature 1)).

SUMMARY

The reformer of a non-limiting aspect of the present disclosure includes a cylindrical reformer body which extends in a horizontal direction and carries out a reforming reaction by a raw fuel gas and water supplied thereto. The reformer body includes therein a vaporization portion which generates steam, and a reforming portion which reacts the steam generated in the vaporization portion with the raw fuel gas to generate a reformed gas. At least one of a convex portion and a rough portion, the rough portion having a higher degree of surface roughness than that of other portions, is disposed on at least one of an inner circumferential surface and an outer circumferential surface of the reformer body.

BRIEF DESCRIPTION OF DRAWINGS

FIG. 9 is a cross-sectional view showing an example of the configuration of a reformer 1B of the non-limiting third embodiment;

DETAILED DESCRIPTION

Figure 1:
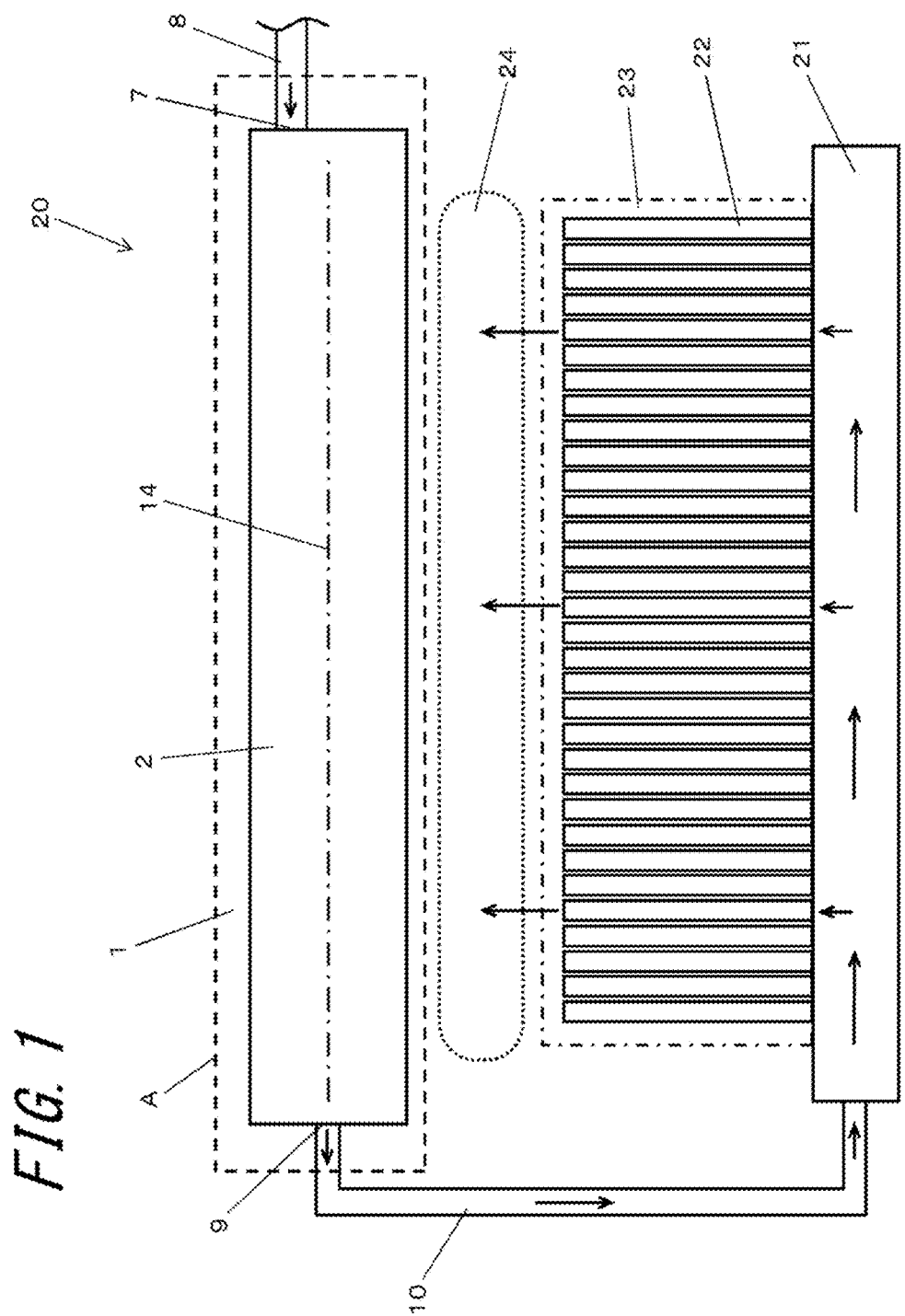
FIG. 1 is a configuration diagram illustrating an example of a cell stack apparatus according to the non-limiting first embodiment.

FIG. 1 is a configuration diagram illustrating an example of a cell stack apparatus 20 according to the non-limiting first embodiment. In the following drawings, the same members are denoted by the same reference numerals. In a cell stack apparatus 20 illustrated in FIG. 1, a reformer 1 is disposed above a cell stack 23 in which a plurality of columnar fuel cells 22 including a gas passage therein are disposed in an upright state and electrically connected to each other via current collecting members (not illustrated).

The lower end of the fuel cell 22 constituting the cell stack 23 is fixed to a manifold 21 which supplies a reformed gas (hydrogen-containing gas) into the fuel cell 22 by an insulating adhesive, and one end of a reformed gas supply pipe 10 is connected to an end of the manifold 21. The other end of the reformed gas supply pipe 10 is connected to a reformed gas delivery port 9 to be described later. The end of the manifold 21 mentioned here is a side surface orthogonal to an arrangement direction of the fuel cells 22 among side surfaces of the manifold 21 and means the side surface on the same side as the reformed gas delivery port 9 side of the reformer 1. The reformed gas needs to be supplied into the fuel cell 22 via the manifold 21, and one end of the reformed gas supply pipe 10 may be connected to an upper surface or a lower surface of the manifold 21.

Both ends of the cell stack 23 is provided with a conductive member (not illustrated) including a current drawing portion for collecting current generated by power generation of the fuel cell 22 and drawing the current out to the outside. Here, the fuel cell 22 is, for example, a flat plate having a hollow center including a reformed gas passage through which the reformed gas flows in a longitudinal direction, and a solid oxide fuel cell in which a fuel electrode layer, a solid electrolyte layer, and an oxygen electrode layer are sequentially disposed on a surface of a support body. When the solid oxide fuel cell is used as the fuel cell 22, the power generation temperature of the fuel cell 22 is extremely high, about 600° C. to 1000° C. As the fuel cell 22, a so-called cylindrical type or a striped type may be used.

In the above-described cell stack apparatus 20, raw fuel such as natural gas or kerosene is supplied into the reformer 1 to be described later to carry out a reforming reaction. The reformed gas obtained by this reforming reaction is supplied to a manifold 21 via a reformed gas supply pipe 10, and the reformed gas supplied to the manifold 21 is supplied to the fuel cell 22. Further, air is supplied as an oxygen-containing gas from the outside of the fuel cell 22, and power generation is performed in the fuel cell 22 by using the reformed gas (hydrogen-containing gas) and air (oxygen-containing gas).

In addition, in a combustion portion 24 located between the cell stack 23 and the reformer 1, a surplus reformed gas not used for power generation in the fuel cell 22 is burned. As a result, the temperature of the reformer 1 may be raised by combustion heat generated by the burning surplus reformed gas. Therefore, the reforming reaction may be efficiently carried out in the reformer 1. In FIG. 1, the flow of the gas is indicated by arrows in the diagram. In a fuel cell module of the present non-limiting embodiment, the above-described cell stack apparatus 20 is housed in a housing, and further, a fuel cell apparatus of the present non-limiting embodiment includes this fuel cell module, an auxiliary machine which operates the fuel cell module, and an exterior case which houses the fuel cell module and the auxiliary machine.

Figure 2:
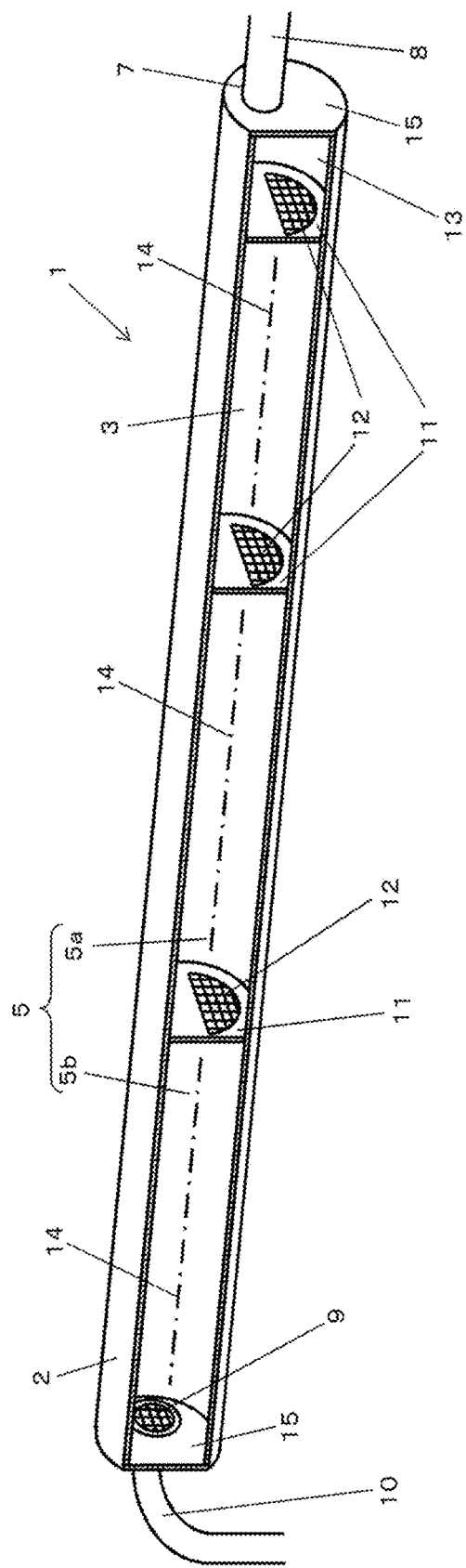
FIG. 2 is a perspective view showing an example of the configuration of the reformer of the non-limiting first embodiment and is an external perspective view showing a part thereof cut out so that the interior of the reformer may be seen.

FIG. 2 is a perspective view showing an example of the configuration of the reformer 1 of the non-limiting first embodiment and is an external perspective view showing a part thereof cut out so that the interior of the reformer 1 may be seen. The reformer 1 of FIG. 2 includes a cylindrical reformer body 2 having a supply port 7 to which the raw fuel gas and water are supplied at one end and extending in the horizontal direction.

Inside the reformer body 2, an introduction portion 13 to which the raw fuel gas and water are supplied from the supply port 7, a vaporization portion 3 which generates steam from this water, and a reforming portion 5 which reacts the steam generated in the vaporization portion 3 with the raw fuel gas for reforming to generate a reformed gas (first reforming portion 5a and second reforming portion 5b) are included. For carrying out the steam reforming, which is an efficient reforming reaction in the reformer 1, the water supplied to the introduction portion 13 is vaporized into steam in the vaporization portion 3, mixed with the raw fuel gas, and the raw fuel gas mixed with steam is supplied to the first reforming portion 5a. The introduction portion 13 also has a function as a vaporization portion because there is a case where part of the introduced water vaporizes. In addition, one reforming portion 5 may be used without being divided into the first reforming portion 5a and the second reforming portion 5b. In addition, at the other end of the reformer body 2, a reformed gas delivery port 9 for delivering a reformed gas is provided.

Here, the reformer 1 shown in FIG. 2 further includes three partition walls 11 which extend in a direction perpendicular to a central axis 14 of the reformer body 2 and partition the reformer body 2. Each of the partition walls 11 includes a flow permission portion 12 on the lower side through which the raw fuel gas and steam and the reformed gas may flow. Here, the lower side is a region from the lower end to the height of approximately ⅔ from the lower end in the height direction inside the reformer 1. A portion of the partition wall 11 other than the flow permission portion 12 is shielded and is a flow impossible portion through which raw fuel gas, steam, and a reformed gas do not flow. By forming the partition wall 11 with a member having high heat transfer, it is possible to accelerate heat transfer to the fluid flowing inside the reformer body 2 and to a reforming catalyst, thereby improving reforming efficiency.

The flow permission portion 12 may include a mesh member attached to the opening of the partition wall 11. Alternatively, the flow permission portion 12 may include a plurality of slit-shaped cuts provided in the partition wall 11 as a plurality of openings elongated in one direction. The interior of the reformer 1 is partitioned in the order of the introduction portion 13, the vaporization portion 3, the first reforming portion 5a, and the second reforming portion 5b by three partition walls 11 from the supply port 7 side to the reformed gas delivery port 9 side. The introduction portion 13 or the vaporization portion 3 may not be provided. The reformer 1 may have one partition wall 11, two partition walls 11, or four or more partition walls 11. In the above-described partition wall 11, the flow permission portion 12 is provided only in the lower side, but the flow permission portion 12 may be provided in the entire height direction. However, even in this case, as shown later, the uppermost portion may be a flow impossible portion.

Here, the supply pipe 8 may be a double pipe of a raw fuel supply pipe and a water supply pipe. In the case of a double pipe, it is possible to provide a water supply pipe inside the raw fuel supply pipe or to provide a raw fuel supply pipe inside the water supply pipe. However, it is, of course, possible to separately provide the raw fuel supply pipe and the water supply pipe.

Figure 3:
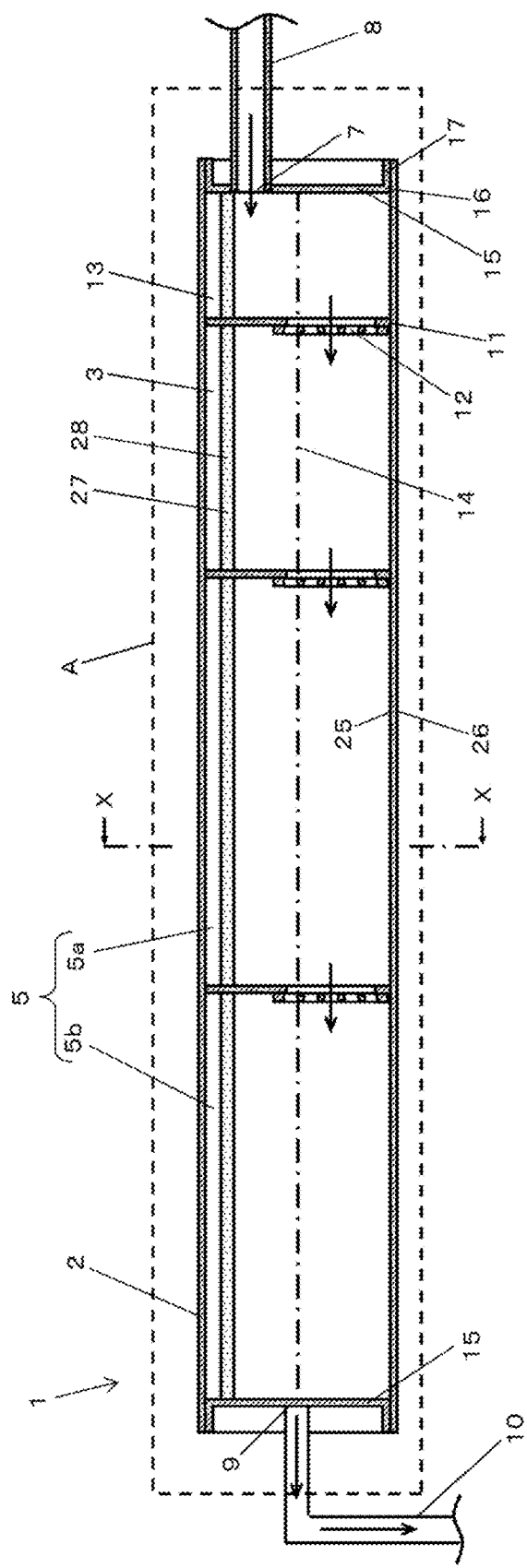
FIG. 3 is a cross-sectional view showing an example of the configuration of the reformer of the non-limiting first embodiment, which is an enlarged sectional view of the portion A of FIG. 1.

FIG. 3 is a cross-sectional view showing an example of the configuration of the reformer 1 of the non-limiting first embodiment, which is an enlarged sectional view of the portion A of FIG. 1. Although not shown, the vaporization portion 3 may be provided with ceramic balls. Thereby, since it is possible to increase the surface area inside the vaporization portion 3, it is possible to efficiently raise the temperature of the raw fuel gas and to efficiently vaporize the supplied water into steam in carrying out steam reforming in the first reforming portion 5a and the second reforming portion 5b.

Inside the first reforming portion 5a and the second reforming portion 5b, a reforming catalyst used for a reforming reaction, which is not shown in FIGS. 2 and 3, is provided. As the reforming catalyst, a reforming catalyst with excellent reforming efficiency and durability may be used. For example, it is possible to use a reforming catalyst having a precious metal such as Ru, Pt or a base metal such as Ni, Fe supported on a porous carrier such as γ-alumina, α-alumina, or cordierite. In addition, as for the reforming catalyst, it is possible to use a reforming catalyst which is generally known in accordance with the reforming reaction carried out in the first reforming portion 5a and the second reforming portion 5b. The partition wall 11 prevents unbalance between the ceramic balls (not shown) in the vaporization portion 3 and the reforming catalyst in the first reforming portion 5a and the second reforming portion 5b.

At this time, the reforming catalyst sinks due to its own weight and is unevenly distributed downward, and a gap is formed between the reforming catalyst and the inner surface of the reformer body 2 in the upper part. Therefore, in a case where the entire partition wall 11 is the flow permission portion 12, when the raw fuel gas and steam are heated and flow upward due to the temperature rise, the efficiency of contact between the raw fuel gas and steam with the reforming catalyst decreases, and there is a possibility that sufficient reforming reaction may not be carried out. In this case, not only the efficiency of generating a reformed gas decreases but also the reformed gas which has not been sufficiently reformed is supplied to the fuel cell 22. Therefore, there is a possibility that carbon deposition may occur in the fuel cell 22 and the fuel cell 22 may deteriorate.

On the other hand, since the reformer 1 of the present non-limiting embodiment has the flow permission portion 12 on the lower side of the partition wall 11, the fluid flows downward in the reformer 1 to improve the efficiency of contact with the reforming catalyst and it is possible to efficiently generate a reformed gas by reforming the raw fuel gas and steam. In a case where the flow impossible portion which does not allow the raw fuel gas, the steam, and the reformed gas to flow is disposed on the upper side of the partition wall 11, it is possible for the fluid to flow further downward in the reformer 1. In addition, since it is possible to suppress the supply of the reformed gas which has not been sufficiently reformed to the fuel cell 22, decrease in the power generation efficiency of the fuel cell 22 and deterioration of the fuel cell 22 may be suppressed.

Here, as shown in FIGS. 1, 2, and 3, the supply port 7 is provided above the central axis line 14 at one end of the reformer body 2. In a case where the reformer 1 is disposed in the fuel cell module, in the inside of the fuel cell module, the temperature in the upper part is raised due to power generation in the fuel cell 22 and combustion in the combustion portion 24. Therefore, in the reformer 1 disposed above the fuel cell module, since the supply port 7 is located at the upper side, the temperature of the raw fuel gas and water supplied to the reformer 1 rises, and it is possible to efficiently generate steam in the reformer 1 and to generate a reformed gas by reforming the raw fuel gas and steam.

Here, since the reformer 1 is heated by combustion in the combustion portion 24 located below the reformer 1, a portion close to the combustion portion 24 of the reformer 1 is likely to be subjected to thermal stress due to heat. Therefore, in a case where the supply port 7 is located at the lower side, since the welded portion of the supply pipe 8 to the reformer body 2 is located close to the combustion portion 24, there is a possibility that stress may concentrate on the welded portion and cracks may occur. On the other hand, however, as described above, since the supply port 7 is located at the upper side and the welded portion of the raw fuel supply pipe 8 to the reformer body 2 is separated from the combustion portion 24, the stress is relieved and occurrence of cracks may be suppressed.

In addition, as shown in FIG. 2, the reformed gas delivery port 9 is provided on the left or right side of the central axis line 14 at the other end of the reformer body 2. In a case where the reformed gas delivery port 9 is disposed at the upper side, the reformed gas which has passed through the portion where the reforming catalyst is not filled is supplied from the reformed gas delivery port 9 to the reformed gas supply pipe 10, and there is a possibility that reformed gas which is insufficiently reformed may be supplied to the fuel cell 22. In addition, in a case where the reformed gas delivery port 9 is disposed at the lower side, stress concentrates on the welded portion of the reformed gas supply pipe 10 to the reformer body 2 as in the case of the supply port 7 described above.

On the other hand, as in the present non-limiting embodiment, in a case where the reformed gas delivery port 9 is provided on the left side or the right side of the central axis line 14, it is possible to suppress the reformed gas which is insufficiently reformed from flowing into the reformed gas delivery port 9. Further, since the welded portion of the reformed gas supply pipe 10 to the reformer body 2 separates from the combustion portion 24, it is possible to suppress stress concentration. The reformed gas delivery port 9 may be provided at the central portion in the left-right direction.

Here, as shown in FIG. 3, the reformer body 2 has lids 15 at one end and the other end. The lid 15 has a lid folded-back portion 17 extending to the outside of the reformer body 2 in the direction of the central axis line 14 at an outer circumferential portion 16 of the lid, and the lid folded-back portion 17 is in contact with the inner surface of the reformer body 2. With such a configuration, the contact area between the lid 15 and the inner surface of the reformer body 2 increases, and deformation of the reformer body 2 is suppressed even in a case where a thermal gradient is generated by heating by the combustion portion 24 or in a case where thermal expansion or thermal contraction occurs. Further, the stress applied to the welded portion of the lid 15 to the reformer body 2 may be relieved. The lid 15 may be directly welded to the reformer body 2 without having the lid folded-back portion 17.

Figure 4:
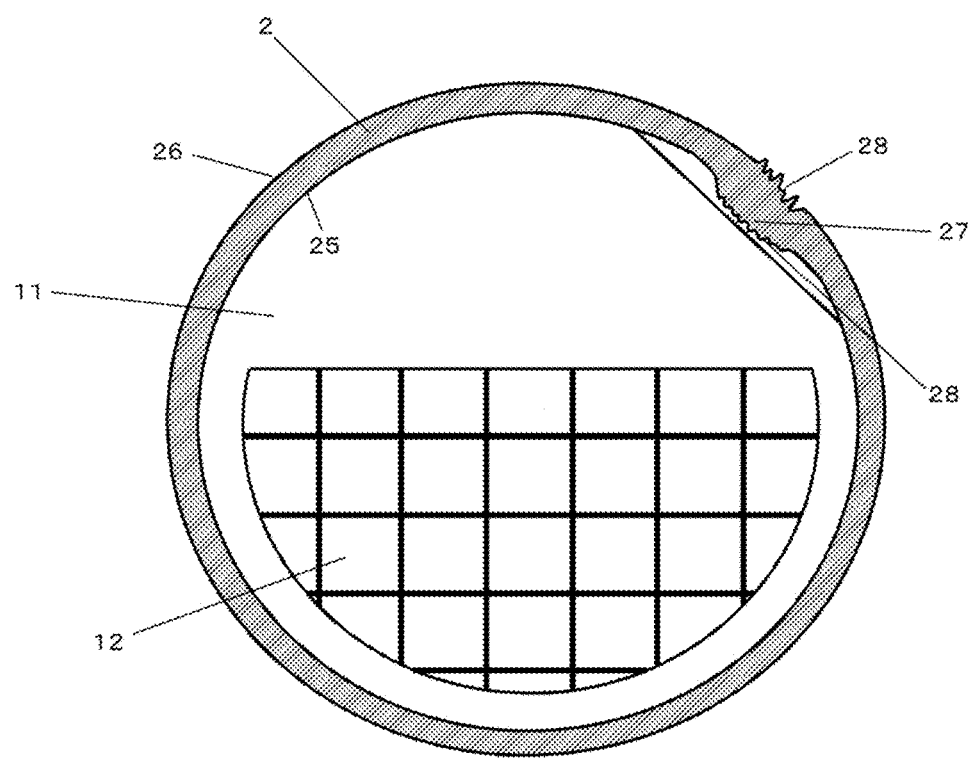
FIG. 4 is a cross-sectional view of a cross section perpendicular to the central axis line of the reformer of the example of the non-limiting first embodiment, which is a cross-sectional view taken along the portion X-X of FIG. 3.

FIG. 4 is a cross-sectional view of a cross section perpendicular to the central axis line 14 of the reformer 1 of the example of the non-limiting first embodiment, which is a cross-sectional view taken along the portion X-X of FIG. 3. As shown in FIGS. 3 and 4, the reformer body 2 included in the reformer 1 of the present non-limiting embodiment includes a convex portion 27 on an inner circumferential surface 25 and a rough portion 28 whose surface roughness is higher than that of other portions on an outer circumferential surface 26. The reformer body 2 included in the reformer 1 of the present non-limiting embodiment may include at least one of the convex portion 27 and the rough portion 28. In addition, the convex portion 27 may be disposed on the outer circumferential surface 26 or the rough portion 28 may be disposed on the inner circumferential surface 25.

With such a configuration, the surface areas of the inner circumferential surface 25 and the outer circumferential surface 26 of the reformer body 2 increase, and it is possible to increase the area where the reformer 1 absorbs heat from the outside and the area where the absorbed heat is radiated to a vaporization catalyst and a reforming catalyst. That is, it is possible to increase the efficiency of absorbing heat from the outside by the reformer 1 and the efficiency of radiating the absorbed heat to the vaporization catalyst and reforming catalyst. By increasing these thermal efficiencies, it is possible to accelerate the vaporization reaction and the reforming reaction, and it is possible to efficiently vaporize water and generate a reformed gas by reforming the raw fuel gas and steam.

In addition, as shown in FIG. 4, in the present non-limiting embodiment, the surface of the convex portion 27 is the rough portion 28. As a result, the inner surface area of the reformer body 2 is further increased, and the thermal efficiency may be further enhanced. Here, as shown in FIG. 3, in the present non-limiting embodiment, the convex portion 27 is disposed in the vaporization portion 3. Thereby, the efficiency of the vaporization reaction in the vaporization portion 3 may be increased. Either the convex portion 27 or the rough portion 28 may be disposed in the vaporization portion 3 or both of the convex portion 27 and the rough portion 28 may be disposed in the vaporization portion 3. In addition, as shown in FIG. 3, in the present non-limiting embodiment, the convex portion 27 and the rough portion 28 extend in the direction of the central axis line 14 of the reformer body 2. As a result, the surface area of the reformer body 2 is further increased, and the thermal efficiency may be further enhanced. The convex portion 27 and the rough portion 28 may be disposed at different positions or a plurality of convex portions 27 and the rough portions 28 may be disposed. In a case where the convex portion 27 and the rough portion 28 are disposed at different positions, it is possible to prevent the part absorbing the heat from the outside and the part radiating the absorbed heat from concentrating in a specific part. In addition, in a case where a plurality of convex portions 27 and rough portions 28 are disposed, it is possible to efficiently carry out the vaporization reaction and the reforming reaction.

The reformer body 2 of the present non-limiting embodiment may be manufactured by, for example, deforming one sheet of plate material into a cylindrical shape and welding the sides of the plate material. In the present non-limiting embodiment, the convex portion 27 disposed on the inner circumferential surface 25 and the rough portion 28 disposed on the outer circumferential surface 26 are disposed on the opposite surfaces at the same portion of the reformer body 2. With such a configuration, at the time of manufacturing the reformer body 2, by welding one sheet of material, the convex portion 27 and the rough portion 28 may be simultaneously formed in the welded portion between the sides of the plate material. The reformer body 2 of the present non-limiting embodiment may be provided by a method other than welding. At that time, the convex portion 27 and the rough portion 28 may be formed appropriately. For example, the reformer body 2 may be prepared by extrusion molding using a metal mold or the like which forms the convex portion 27 at the time of production, and the step of roughening (such as blast processing) a part of the surface of the completed reformer body may be included.

Here, the convex portion 27 and the rough portion 28 may be disposed above the central axis line 14. Due to the heating by the combustion portion 24, the temperature below the central axis line 14 of the reformer body 2 is raised, and thermal expansion or thermal contraction tends to occur more than the upper side. Therefore, if the convex portion 27 and the rough portion 28 are disposed below the central axis line 14, stress due to heat concentrates on the convex portion 27 and the rough portion 28, and there is a possibility that cracks may occur. By providing the convex portion 27 and the rough portion 28 above the central axis line 14, the convex portion 27 and the rough portion 28 are separated from the combustion portion 24, and it is possible to suppress such stress concentration and to relieve the stress applied to the convex portion 27 and the rough portion 28.

In addition, the convex portion 27 may be disposed on the inner circumferential surface 25 at a position other than the upper end of the reformer body 2. As shown in FIG. 4, in the partition wall 11, a notch portion may be provided in order to avoid mechanical interference with the convex portion 27, and in a case where the notch portion is provided, a gap is formed between the notch portion and the inner surface of the reformer body 2. At this time, in a case where the convex portion 27 is disposed on the inner circumferential surface 25 at the position of the upper end of the reformer body 2, a gap is formed between the partition wall 11 and the inner surface of the reformer body 2 at the upper end, and in addition, as the reforming catalyst sinks due to the its own weight, a gap is also formed between the partition wall 11 and the inner surface of the reformer body 2 at the upper end. Therefore, when the raw fuel gas and steam are heated and flow upward due to the temperature rise, the raw fuel gas and steam pass the gap to pass through the partition wall 11, and there is a possibility that the connection efficiency with the catalyst may decrease. On the other hand, since the gap between the partition wall 11 and the inner surface of the reformer body 2 is located at a position different from the gap of the reforming catalyst by providing the convex portion 27 at a position other than the upper end, such a reduction in contact efficiency may be avoided. In the present non-limiting embodiment, the convex portion 27 is disposed on an obliquely upper part of the reformer body 2 and at a position rotated by about 45° from the upper end. The rotation angle may be set appropriately, but may be in the range of 90° to the left and right from the upper end.

Figure 5:
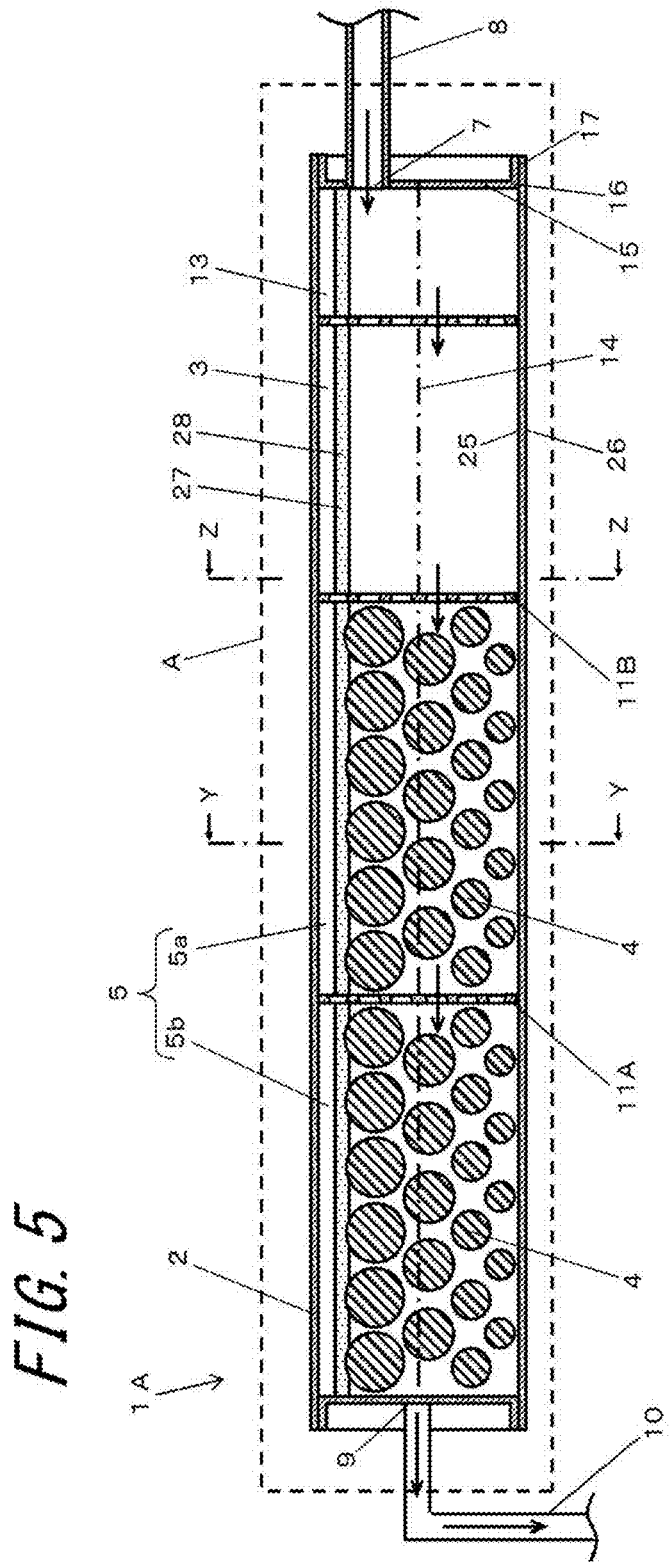
FIG. 5 is a cross-sectional view showing an example of the configuration of a reformer 1A of the non-limiting second embodiment.

Next, a reformer of a non-limiting second embodiment will be described. FIG. 5 is a cross-sectional view showing an example of the configuration of a reformer 1A of the non-limiting second embodiment. The reformer 1A of the present non-limiting embodiment is different from the reformer 1 of the non-limiting first embodiment in the structure of the partition wall, and other structures are the same, and therefore the same parts are denoted by the same reference numerals, and description thereof is omitted. Ceramic balls (not shown) may also be disposed in the vaporization portion 3 as in the non-limiting first embodiment.

Inside the first reforming portion 5a and the second reforming portion 5b, the reforming catalyst 4 used for a reforming reaction is disposed. As the reforming catalyst 4, a reforming catalyst 4 having excellent reforming efficiency and durability may be used, for example, it is possible to use a reforming catalyst having a precious metal such as Ru, Pt, or a base metal such as Ni, Fe supported on a porous carrier such as γ-alumina, α-alumina, or cordierite. In addition, as for the reforming catalyst 4, it is possible to use a reforming catalyst which is generally known in accordance with the reforming reaction carried out in the first reforming portion 5a and the second reforming portion 5b. A partition wall 11A prevents a bias from occurring in the ceramic balls in the vaporization portion 3 and the reforming catalyst in the first reforming portion 5a and the second reforming portion 5b.

Figure 6:
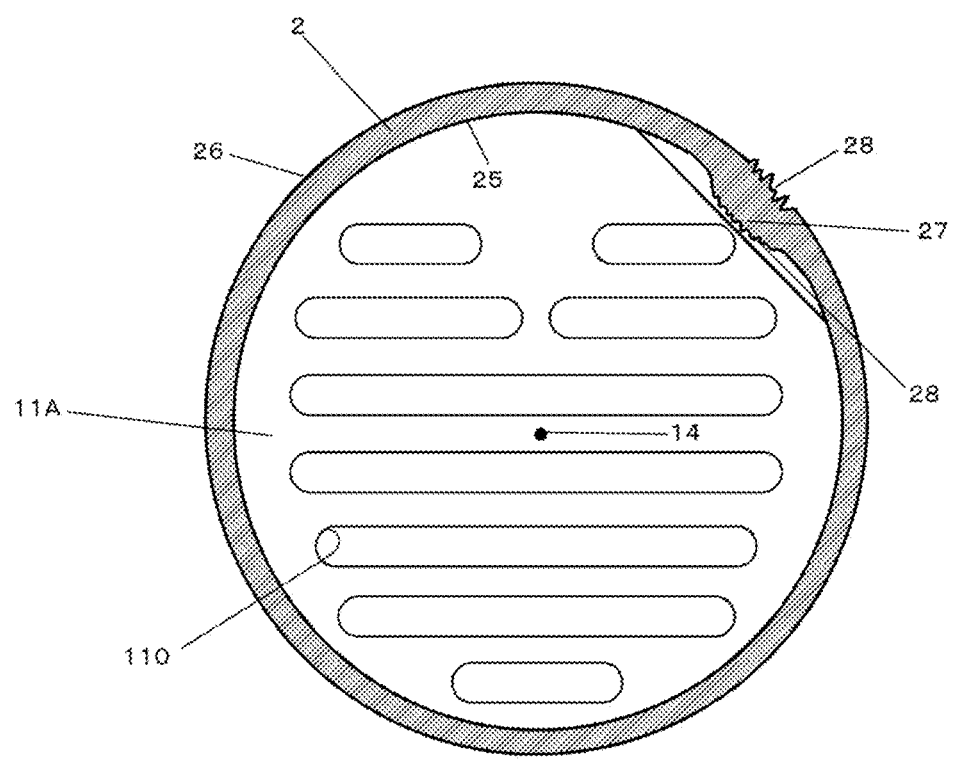
FIG. 6 is a cross-sectional view of a cross section perpendicular to the central axis line 14 of the reformer 1A of an example of the non-limiting second embodiment, which is a cross-sectional view taken along the portion Y-Y of FIG. 5.

FIG. 6 is a cross-sectional view of a cross section perpendicular to the central axis line 14 of the reformer 1A of an example of the non-limiting second embodiment, which is a cross-sectional view taken along the portion Y-Y of FIG. 5. In the first reforming portion 5a and the second reforming portion 5b, the reforming catalyst 4 sinks due to its own weight and is unevenly distributed downward, and a gap is formed between the reforming catalyst 4 and the inner surface of the reformer body 2 in the upper part. The partition wall 11A of the present non-limiting embodiment is provided with an opening through which the raw fuel gas, the steam, and the reformed gas may flow in approximately the entire partition wall, and the opening area on the lower side of the central axis line 14 is larger than the opening area on the upper side of the central axis line 14. In the example shown in FIG. 6, a slit-shaped opening (simply "slit") 110 extending in the left-right direction is provided on the entire wall of the partition wall 11A. An upper side of the central axis line 14 is, for example, a semicircular portion on the upper side of the partition wall 11A, and a lower side of the central axis line 14 is, for example, a semicircular portion on the lower side of the partition wall 11A. When the sum of the areas of the openings formed by a plurality of slits 110 provided in the semicircular portion on the upper side is compared with the sum of the areas of the openings formed by the plurality of slits 110 provided in the semicircular portion on the lower side, the sum of the areas of the openings by the plurality of slits 110 on the lower side is larger. The raw fuel gas and steam are likely to flow on the lower side of the partition wall having a large opening area. The reforming catalyst 4 sinks due to its own weight and is unevenly distributed downward, but a large amount of fluid flows downward in the reformer 1 by the partition wall 11A to improve the efficiency of contact with the reforming catalyst 4 and it is possible to efficiently generate a reformed gas by reforming the raw fuel gas and steam. In addition, since the upper side is also opened, it is possible to suppress an increase in unnecessary pressure loss when the fluid passes through the partition wall 11A.

All the partition walls provided in the reformer body 2 may be such a partition wall 11A, and at least one partition wall may be such a partition wall 11A. The opening provided in the partition wall 11A is not limited to the slit extending in the left-right direction and may be a slit extending in a vertical direction or a slit extending in an oblique direction. The shape of the opening is not limited to a slit shape, but may be a combination of a plurality of shapes including a circular shape, a rectangular shape, a polygonal shape, and a slit shape. In addition, in a case where one opening is provided over the semicircular portion on the upper side and the semicircular portion on the lower side, the area of the opening portion on the semicircle portion on the upper side may be the opening area on the upper side and the area of the opening portion on the semicircular portion on the lower side may be the opening area on the lower side.

The partition wall 11A has an opening area on the lower side larger than an opening area on the upper side. In other words, in the semicircular portion on the upper side, the area of the real portion other than the opening is larger than the area of the real portion of the semicircular portion on the lower side. The temperature inside the reformer 1 may be measured by utilizing the size of the real portion on the upper side, for example, connecting a sheath pipe to the real portion and inserting a thermocouple into the sheath pipe.

Figure 7:
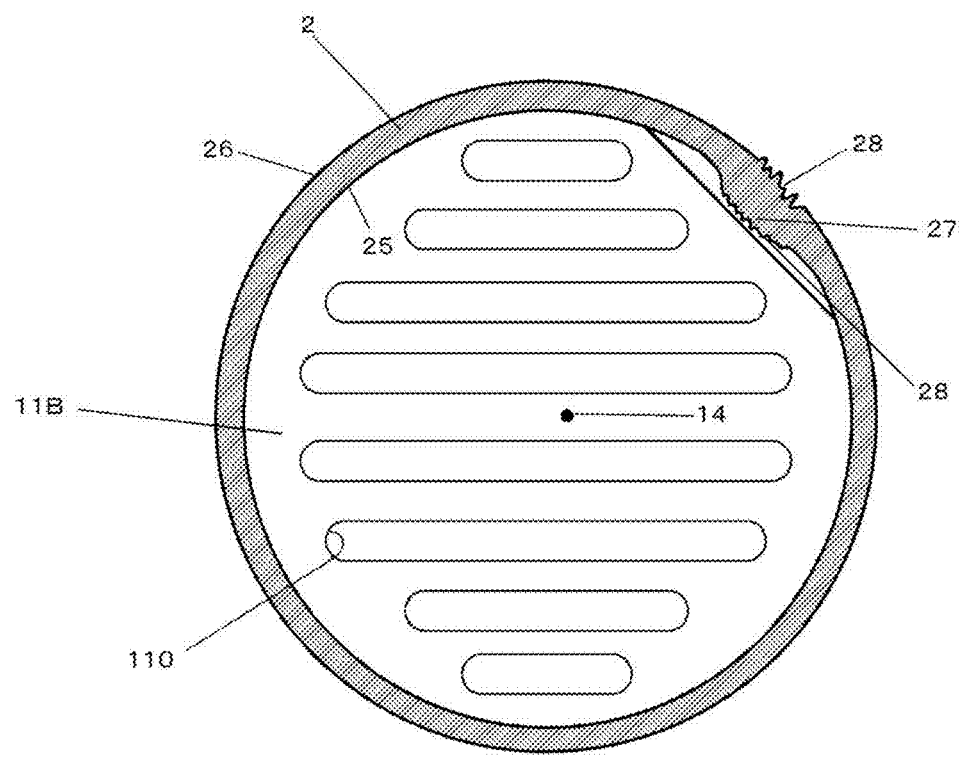
FIG. 7 is a cross-sectional view of a cross section perpendicular to the central axis line 14 of the reformer 1A of an example of the non-limiting second embodiment, which is a cross-sectional view taken along the portion Z-Z of FIG. 5.

In addition to the partition wall 11A as described above, the plurality of partition walls disposed in the reformer body 2 may include partition walls in which the opening area on the lower side is smaller than the opening area on the upper side, or may include partition walls in which the opening area on the lower side and the opening side on the upper side are the same. FIG. 7 is a cross-sectional view of a cross section perpendicular to the central axis line 14 of the reformer 1A of an example of the non-limiting second embodiment, which is a cross-sectional view taken along the portion Z-Z of FIG. 5. A partition wall 11B shown in this example is a case where the opening area on the lower side and the opening area on the upper side are the same. For example, the slits 110 provided in the semicircular portion on the upper side and the slits 110 provided in the semicircular portion on the lower side are symmetrical with respect to the center axis line 14. Since the slits 110 are symmetrical in the vertical direction, the opening area is the same in the vertical direction. It is not necessary that the slits 110 are symmetrical in the vertical direction, and the arrangement, size, shape, and the like of the slits 110 may be different as long as the opening areas are the same. Since the opening area of the partition wall 11B is the same in the vertical direction, the flow of the gas passing through the partition wall 11B is not deflected particularly by the partition wall 11.

In the present non-limiting embodiment, the partition wall includes the partition wall 11A having a larger opening area on the lower side and the partition wall 11B having the same size of opening areas in the vertical direction. By combining different types of partition walls, it is possible to deliberately deflect the flow of gas flowing in the reformer body 2, for example, to improve the efficiency of contact with the reforming catalyst 4.

Figure 8A:
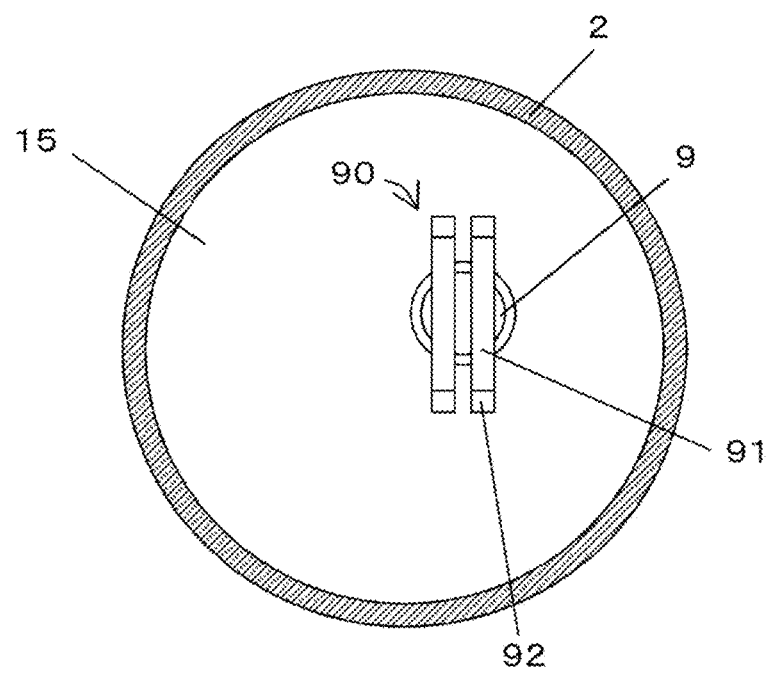
FIG. 8A is a diagram showing the lid 15 as viewed from the central axis line direction.
Figure 8B:
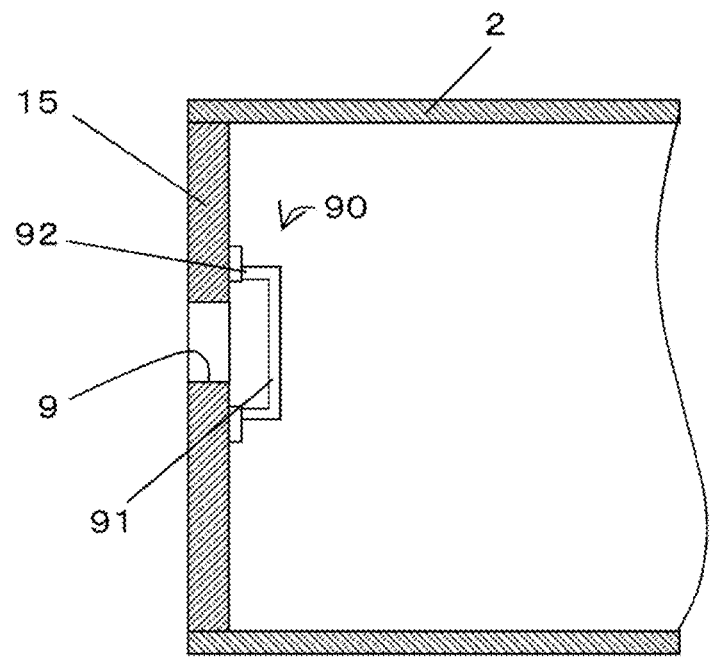
FIG. 8B is a sectional view of the lid 15.

FIG. 8A is a diagram showing the lid 15 as viewed from the central axis line direction, and FIG. 8B is a sectional view of the lid 15. The lid 15 provided with the reformed gas delivery port 9 faces the reforming portion 5, and among the reforming catalysts 4 housed in the reforming portion 5, those having a relatively small particle diameter may flow out to the reformed gas supply pipe 10 through the reformed gas delivery port 9. As shown in FIGS. 8A and 8B, the reformer 1A of the present non-limiting embodiment includes an outflow prevention member 90 which prevents the reforming catalyst 4 from flowing out from the reformed gas delivery port 9. The outflow prevention member 90 includes a belt-shaped portion 91 disposed at a predetermined space from the reformed gas delivery port 9 and fixing portions 92 for fixing both ends of the belt-shaped portion 91 to the inner surface of the reformer body 2 (the inner surface of the lid 15).

In the present non-limiting embodiment, there are two belt-shaped portions 91, which extend in parallel in the vertical direction. The fixing portions 92 are respectively connected to both ends of the belt-shaped portion 91, and the belt-shaped portion 91 is connected to the inner surface of the lid 15 via the fixing portions 92. By means of these fixing portions 92, the belt-shaped portion 91 may be held inwardly at a predetermined space from the reformed gas delivery port 9. The predetermined space is made smaller than the minimum particle diameter of the reforming catalyst 4 to be housed. Further, the space between the belt-shaped portions 91 is also made smaller than the minimum particle diameter of the reforming catalyst 4 to be housed. Thus, it is possible to suppress the reforming catalyst 4 from passing through the outflow prevention member 90. In addition, since the reforming catalyst 4 is spaced from the reformed gas delivery port 9 by the belt-shaped portion 91, it is possible to suppress that the reformed gas delivery port 9 is blocked by the reforming catalyst 4 or the amount of the reformed gas to be delivered is reduced.

The material constituting the outflow prevention member 90 may be any material as long as the material is strong enough not to be deformed even by contact with the reforming catalyst 4 or the like and does not cause corrosion or the like even under a high temperature and high humidity environment, and for example, a metal material such as corrosion-resistant stainless steel may be used.

The outflow prevention member 90 is not limited to the belt-shaped portion 91 extending in the vertical direction, and may extend in the left-right direction or may extend in the oblique direction as long as the outflow prevention member 90 may suppress the outflow of the reforming catalyst 4 flowing out from the reformed gas delivery port 9. Further, by appropriately setting the size of the reformed gas delivery port 9 and the size of the belt-shaped portion 91, the belt-shaped portion 91 may be a single belt-shaped portion 91 or may be formed of three or more belt-shaped portions 91.

Next, a reformer of a non-limiting third embodiment will be described. FIG. 9 is a cross-sectional view showing an example of the configuration of a reformer 1B of the non-limiting third embodiment. The reformer 1B of the present non-limiting embodiment is different from the reformer 1 of the non-limiting first embodiment in the structure of the lid 15, and other structures are the same, and therefore the same parts are denoted by the same reference numerals, and description thereof is omitted. Ceramic balls (not shown) may also be disposed in the vaporization portion 3 as in the non-limiting first embodiment.

Figure 10:
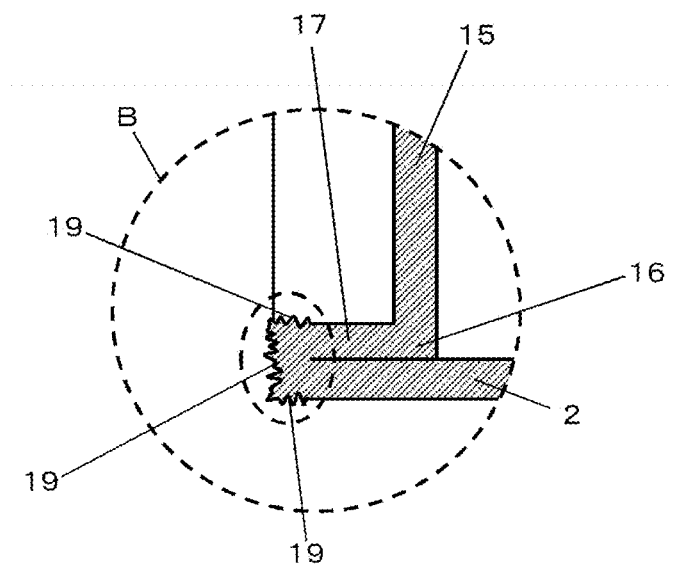
FIG. 10 is a cross-sectional view showing an example of a configuration of a coupling portion between the reformer body 2 and the lid 15 provided in the reformer 1B according to an example of the present non-limiting embodiment, in which the portion B in FIG. 9 is enlarged.

FIG. 10 is a cross-sectional view showing an example of a configuration of a coupling portion between the reformer body 2 and the lid 15 disposed in the reformer 1B according to an example of the present non-limiting embodiment, in which the portion B in FIG. 9 is enlarged. As shown in FIG. 10, in the outer circumferential portion 16 of the lid, the surface of the connecting portion where the lid folded-back portion 17 is welded to the reformer body 2 is a rough surface, and the rough portion 19 is disposed on the surface of the outer circumferential portion 16 of the lid. With such a configuration, when the reformer 1B is heated by using the heat generated by the power generation in the fuel cell 22 and the combustion in the combustion portion 24, the surface area of the reformer 1B which receives heat from the outside increases, the temperature inside the reformer 1 rises, and it is possible to efficiently generate a reformed gas.

Figure 11:
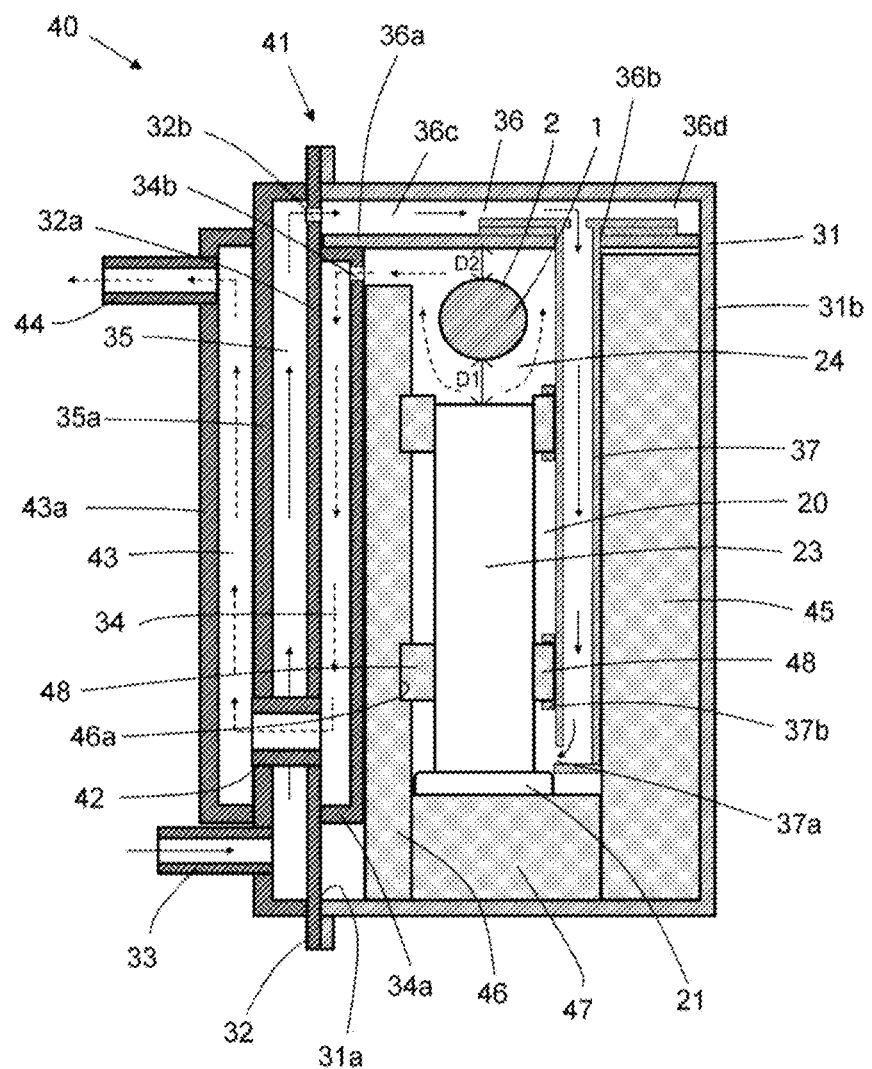
FIG. 11 is a cross-sectional view taken along a cross section perpendicular to the central axis line of a fuel cell module.

FIG. 11 is a cross-sectional view taken along a cross section perpendicular to the central axis line 14 of a fuel cell module 40. The fuel cell module 40 includes the above-described cell stack apparatus 20 and a housing 41 which houses the cell stack apparatus 20. The housing 41 includes a box 31 with one side opened and a housing lid 32 for closing an opening 31a of the box 31. In the present non-limiting embodiment, the box 31 has a rectangular parallelepiped shape, and one surface of a pair of surfaces having the largest area among the six surfaces of the rectangular parallelepiped is open. Another surface 31b facing the opening 31a is a bottom surface 31b of the box 31, and the other four surfaces are the side surfaces of the box 31.

The flow of the oxygen-containing gas and the exhaust gas in the fuel cell module 40 will be described together with the configuration of each passage. In the present non-limiting embodiment, the oxygen-containing gas is air existing outside the fuel cell module 40. A tubular introduction portion 33 for supplying this air from the outside into the fuel cell module is disposed on the outer surface of the housing lid 32.

The housing lid 32 includes a first gas passage through which either one of the oxygen-containing gas and the exhaust gas discharged from an accommodating chamber flows and a second gas passage which is disposed adjacent to the first gas passage and through which the other one of the oxygen-containing gas and the exhaust gas flows. In the present non-limiting embodiment, the gas passage provided on the inner side, that is, on the box 31 side is a first gas passage 34, and the exhaust gas flows through the first gas passage 34. In addition, the gas passage provided on the outer side is a second gas passage 35, and the air as the oxygen-containing gas flows through the second gas passage 35. In the drawing, there is shown an example in which the first gas passage 34 is provided inside the housing lid 32 (on the box 31 side) and the second gas passage 35 is provided on the outside (outer surface side), but the first gas passage and the second gas passage may be provided on the inner side of the housing lid 32 (on the box 31 side) or on the outside (outer surface side) of the housing lid 32. By disposing a second heat insulating material 46 to be described later with a gap from the first gas passage 34, instead of the first gas passage 34, this gap may be a fifth gas passage through which the other one of the oxygen-containing gas and the exhaust gas flows.

The housing lid 32 includes a flat plate shaped lid body 32a which covers the opening 31a of the box 31, a first passage member 34a which is disposed on the inner surface side of the lid body 32a facing the box 31 and defines the first passage 34, and a second passage member 35a which is disposed on the outer surface side of the lid body 32a facing the outer side and defines the second gas passage 35. Both the first passage member 34a and the second passage member 35a are substantially rectangular plate shaped members, on the four sides, portions which are erected by the width of the passage are provided on the first surface (one main surface) side of the second passage member 35a and on the first surface (one main surface) of the first passage member 34a. By joining the erect four sides to the inner surface or the outer surface of the lid body 32a, the gap between the lid body 32a and the first passage member 34a becomes the first gas passage 34, and the gap between the lid body 32a and the second passage member 35a becomes the second gas passage 35. That is, in the present non-limiting embodiment, the lid body 32a serves as a passage partitioning portion that partitions the first gas passage 34 and the second gas passage 35.

In the fuel cell module 40 of the present non-limiting embodiment, it is possible to easily form the air passage and the exhaust gas passage by joining and overlapping the first passage member 34a and the second passage member 35a so as to provide a gap in the flat plate shaped lid body 32a. In addition, by providing the gas passages in the housing lid 32, the number of gas passages provided in the box 31 may be reduced, and the configuration of the box 31 may be simplified.

In the present non-limiting embodiment, the introduction portion 33 which introduces air is in communication with the second gas passage 35. The introduction portion 33 is disposed, for example, at the lower end of the housing lid 32, and the air introduced from the introduction portion 33 flows upward from the second gas passage 35 from the lower side. The second gas passage 35 also serves as a meandering passage. Then, at the upper end of the second gas passage 35, in order to allow air to flow into the interior of the housing 41, that is, inwardly from the housing lid 32, an inflow port 32b, such as a hole or a slit, which penetrates in the thickness direction (right and left direction) is provided at the upper end of the lid body 32a. In the present non-limiting embodiment, a plurality of through holes arranged in parallel along the arrangement direction of the fuel cells 22 of the cell stack 23 are provided as the inflow port 32b. By adopting a structure in which a plurality of through holes are provided, it is possible to suppress a decrease in mechanical strength and allow a sufficient amount of air to flow inwardly from the housing lid 32.

Air flowing into the inside of the housing 41 from the inflow port 32b flows over the reformer 1 and the cell stack 23 to the bottom surface 31b side of the box 31 via the third gas passage 36 formed in the box 31 above the reformer 1. The third gas passage 36 is defined by the inside surface of the box 31 which faces the reformer 1, that is, a third passage member 36a which is a passage wall formed of a plate-shaped member parallel to the inner surface located on the upper portion during operation.

The third gas passage 36 is connected to an oxygen-containing gas introduction plate 37 at the downstream side in the flow direction and at a position between the reformer 1 and the cell stack 23, and the bottom surface 31b. The oxygen-containing gas introduction plate 37 is, for example, a component obtained by joining two plate-like members with a gap therebetween at the outer circumference thereof, only the portion which communicates with the third gas passage 36 and an oxygen-containing gas introduction port 37a for supplying the air as the oxygen-containing gas to the cell stake 23 are opened, and the rest is closed.

The third gas passage 36 is provided on the side which is one end side in the longitudinal direction of the fuel cell 22, and the introduction portion 33 and the oxygen-containing gas introduction port 37a are provided on the lower side which is the other end side in the longitudinal direction of the fuel cell 22.

The oxygen-containing gas introduction plate 37 is connected to the third gas passage 36 in a communication hole 36b provided in the third passage member 36a, and the air flowing through the third gas passage 36 flows into the oxygen-containing gas introduction plate 37 through the communication hole 36b.

In the present non-limiting embodiment, the third gas passage 36 includes a main passage portion 36c which provides a connection from the second gas passage 35 to the oxygen-containing gas introduction plate 37, and an extended portion 36d extending from the position where the oxygen-containing gas introduction plate 37 and the main passage portion 36c are connected to the bottom surface 31b side of the box 31. The extended portion 36d may not be provided, and the third gas passage 36 may include only the main passage portion 36c.

The air flowing into the oxygen-containing gas introduction plate 37 flows downward along the bottom surface 31b of the box 31, is discharged from the oxygen-containing gas introduction port 37a provided at the downstream end in the flow direction, and is supplied between the fuel cells 22 of the cell stack 23.

The air supplied between the fuel cells 22 is used for power generation reaction together with the reformed gas supplied from the reformer 1 via the manifold 21 in the fuel cells 22, and power is generated in each fuel cell 22.

The reformed gas which has not been used in the power generation reaction and the air are burned in the combustion portion 24 between the cell stack 23 and the reformer 1 to generate a high-temperature exhaust gas. The exhaust gas flows into the first gas passage 34 via a communication hole 34b provided on an upper part of the first passage member 34a and flows downward along the lid body 32a. As described above, the air flowing from the outside flows upward through the second gas passage 35, the exhaust gas flows downward through the first gas passage 34 adjacent to the second gas passage 35, and in the meantime, heat is exchanged between the relatively low temperature air and the relatively high temperature exhaust gas with the lid body 32a interposed therebetween, whereby the air is warmed and the exhaust gas is cooled.

At the lower end which is the downstream end of the first gas passage 34, the heat-exchanged exhaust gas is discharged to the outside of the second gas passage 35 via the discharge portion 42 crossing the second gas passage 35 so as to be orthogonal to the flow direction of the second gas passage 35.

The exhaust gas discharged from the discharge portion 42 is supplied to a heat exchanger. In the heat exchanger, heat exchange is performed with a medium supplied from the outside, and the heated medium is used, for example, directly or indirectly in a hot water supply apparatus, and the condensed water generated by exchanging the exhaust gas with heat is reused for steam reforming in the reformer 1 thereafter. In the present non-limiting embodiment, a fourth gas passage 43 is provided on the further outer side of the second gas passage 35, and the exhaust gas discharged from the discharge portion 42 flows into the fourth gas passage 43 and flows upward along the fourth gas passage 43. In the fourth gas passage 43, for example, a combustion catalyst for burning an unburned gas which has not been burned yet in the combustion portion 24 may be disposed so that the unburned gas is not discharged from the fuel cell module 40 to the outside. Like the first gas passage 34 and the second gas passage 35, the fourth gas passage 43 is defined by a fourth passage member 43a.

At the lower end which is the downstream end of the fourth gas passage 43, the exhaust gas flowing upward along the fourth gas passage 43 communicates with a connection pipe 44 with the heat exchanger and is supplied to the heat exchanger via the connection pipe 44.

In addition, inside the housing 41, a heat insulating material for keeping the temperature inside the fuel cell module 40 at a high temperature is appropriately disposed so that the heat inside the fuel cell module 40 is extremely dissipated and the temperature of the fuel cell 22 is lowered and the amount of power generation does not decrease.

A first heat insulating material 45 is disposed so as to cover the entire bottom surface 31b between the bottom surface 31b of the box 31 and the oxygen-containing gas introduction plate 37. The second heat insulating material 46 is disposed between the cell stack 23 and the first passage member 34a of the first gas passage 34. A third heat insulating material 47 is disposed at a position on the lower side of the manifold 21 during operation. The three sides of the cell stack 23 are surrounded by the first heat insulating material 45, the second heat insulating material 46, and the third heat insulating material 47 disposed at positions on the right and left sides and the lower side during operation, and since the combustion portion 24 is disposed above the cell stack 23, the temperature decrease of the fuel cell 22 due to the dissipation of heat is suppressed.

Further, a belt-shaped fourth heat insulating material 48 extending along the arrangement direction of the cell stack 23 is disposed between the oxygen-containing gas introduction plate 37 and the cell stack 23. Two of the fourth heat insulating materials 48 are vertically disposed with a space therebetween. With the cell stack 23 interposed in between, similarly, on the side opposite to the fourth heat insulating material 48, two of the fourth heat insulating materials 48 are vertically disposed a space therebetween and are disposed between the second heat insulating material 46 and the cell stack 23. The fourth heat insulating material 48 disposed between the oxygen-containing gas introduction plate 37 and the cell stack 23 is disposed on a heat insulating material fixing member 37b disposed on the surface of the oxygen-containing gas introduction plate 37 facing the cell stack 23, and the height position thereof is positioned. Thereby, the cell stack apparatus 20 may be supported at an appropriate position in the transport state or the operating state.

Further, the fourth heat insulating material 48 disposed between the second heat insulating material 46 and the cell stack 23 is fitted into a groove shaped concave portion 46a provided on the surface of the second heat insulating material 46 facing the cell stack 23, and the height position thereof is positioned. Thereby, the cell stack apparatus 20 may be supported at an appropriate position in the transport state or the operating state.

As shown in FIG. 11, in the present non-limiting embodiment, D1>D2 is satisfied, where D1 denotes the distance between the cell stack 23 and the reformer body 2 and D2 denotes the distance between the reformer body 2 and the third passage member 36a. That is, the space between the reformer body 2 and the third passage member 36a is narrower than the space between the reformer body 2 and the cell stack 23. In the housing 41, a relatively warm gas flows upward. In particular, the high-temperature exhaust gas burned in the combustion portion 24 flows on the third passage member 36a side above the reformer 1 and then flows into the first gas passage 34 via the communication hole 34b. Since the space between the reformer body 2 and the third passage member 36a is narrower, the time during which the exhaust gas accumulates in the space between the reformer body 2 and the third passage member 36a becomes longer. The air flowing through the third passage member 36 exchanges heat with the exhaust gas via the third passage member 36a and is heated, but as the time during which the exhaust gas accumulates at the space between the reformer body 2 and the third passage member 36a becomes longer, the heat exchange efficiency between the exhaust gas and the air via the third passage member 36a may be increased. That is, as the time during which the exhaust gas accumulates at the space between the reformer body 2 and the third passage member 36a becomes longer, the amount of heat exchange between the accumulated exhaust gas and the air flowing through the third passage member 36a increases, and the temperature of the accumulated exhaust gas decreases. Thereby, it is possible to reduce stress due to heat on the upper side of the reformer body 2. In particular, in a case where at least one of the above-described convex portion 27 or rough portion 28 is disposed on the upper part of the reformer body 2, the stress may be more effectively reduced.

As described above, the reformer body 2 includes at least one of the convex portion 27 and the rough portion 28, and it is possible to increase the efficiency of absorbing heat from the outside and the efficiency of radiating the absorbed heat to the vaporization catalyst and the reforming catalyst. Further, by setting D1>D2, the time during which the exhaust gas accumulates at the space between the reformer body 2 and the third passage member 36a becomes longer, and it is possible to further warm the air flowing through the third passage member 36 and to reduce the stress on the upper side of the reformer body 2.

Figure 12:
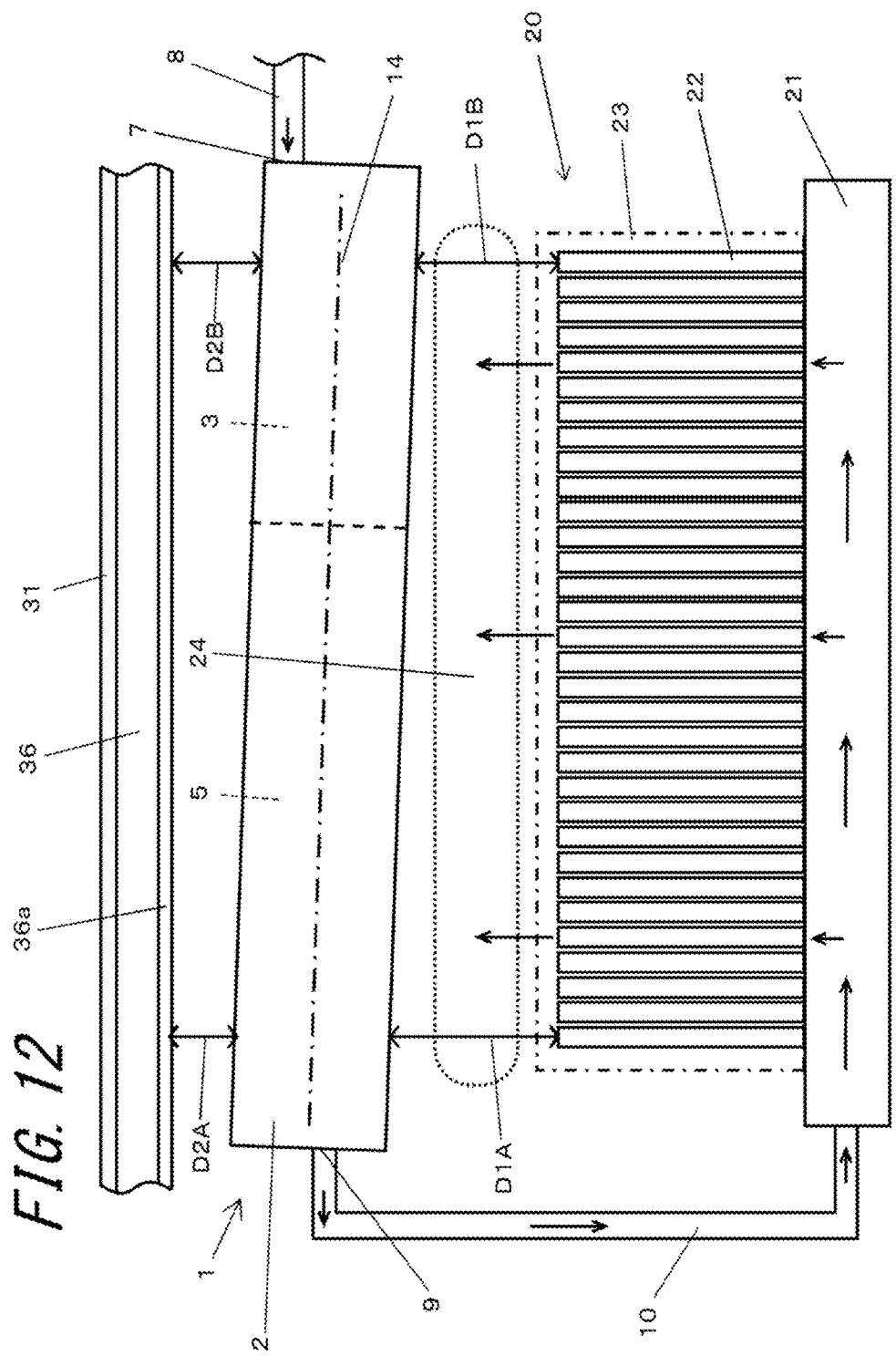
FIG. 12 is a schematic view of the interior of the fuel cell module as viewed from the side.

FIG. 12 is a schematic view of the interior of the fuel cell module 40 of another embodiment as viewed from the side. In the present non-limiting embodiment, as shown in FIG. 12, the reformer body 2 is disposed so as to be inclined with respect to the arrangement direction of the cell stack 23 (left-right direction of the page). The fuel cells 22 constituting the cell stack 23 all have the same outer shape, and therefore the upper surfaces of the fuel cells 22 are aligned at the same height. Since the reformer body 2 is inclined, the distance between the reformer body 2 and the cell stack 23 continuously varies along the direction of the central axis line 14 of the reformer body 2.

The vaporization portion 3 and the reforming portion 5 are disposed along the central axis line 14 of the reformer body 2, and the distance between the cell stack 23 and the end of the reformer body 2 on the side where the reforming portion 5 is disposed is defined as D1A. In addition, the distance between the cell stack 23 and the end of the reformer body 2 on the side where the vaporization portion 3 is disposed is defined as D1B. At this time, the reformer body 2 is inclined so that D1A>D1B is satisfied. That is, in the reformer body 2, the end on the side of the reforming portion 5 is separated from the cell stack 23 more than the end on the side of the vaporization portion 3. In addition, the third passage member 36a is disposed parallel to the arrangement direction of the cell stack 23. D2A<D2B is satisfied, where D2A denotes the distance between the third passage member 36a and the end of the reformer body 2 on the side where the reforming portion 5 is disposed, and D2B denotes the distance between the third passage member 36a and the end of the reformer body 2 on the side where the vaporization portion 3 is disposed.

The temperature inside of the reforming portion 5 is relatively higher than that of the vaporization portion 3 due to the reforming reaction. Further, the reformer body 2 is heated by the high-temperature exhaust gas generated in the combustion portion 24. Since the end on the side of the reforming portion 5 is separated from the cell stack 23 and is also separated from the combustion portion 24, it is possible to suppress stress concentration on the reforming portion 5 and to relieve the stress applied to the convex portion 27 and the rough portion 28 of the reformer body 2.

In addition, since stress concentration is unlikely to occur at the end on the side of the vaporization portion 3 where the temperature is not likely to become relatively high and the end is close to the cell stack 23 and also close to the combustion portion 24, it is easy to heat and to efficiently vaporize water into steam.

The magnitude relation between D1A and D2A and the magnitude relation between D1B and D2B are not particularly limited, but as in the embodiment shown in FIG. 11, it is possible to set D1A>D2A and D1B>D2B.

Figure 13:
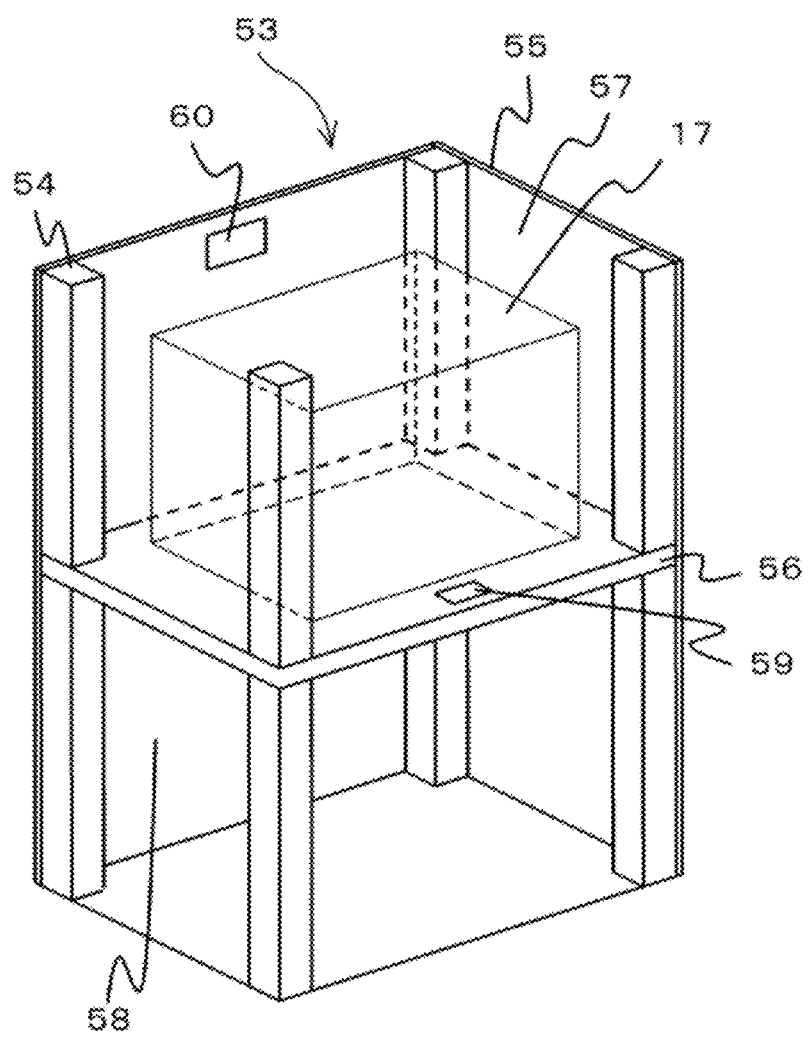
FIG. 13 is an exploded perspective view showing a configuration of a fuel cell apparatus according to an example of the present non-limiting embodiment.

FIG. 13 is an exploded perspective view showing a configuration of a fuel cell apparatus 60 according to an example of the present non-limiting embodiment, in which the fuel cell module 40 which houses the cell stack apparatus 20 in the housing 41, and an auxiliary machine (not shown) which operates the fuel cell module 40 are housed in an exterior case 50. A part of the configuration is omitted in FIG. 13.

In the fuel cell apparatus 60, the inside of the exterior case 50 including a support 51 and an exterior plate 52 is partitioned vertically by a partition plate 53. The upper side is configured as a module accommodating chamber 54 which houses the fuel cell module 40 described above and the lower side is configured as an auxiliary accommodating chamber 55 which houses an auxiliary machine which operates the fuel cell module 40. The auxiliary machine housed in the auxiliary accommodating chamber 55 is omitted.

In addition, the partition plate 53 is provided with an air flow port 56 for allowing the air in the auxiliary accommodating chamber 55 to flow toward the module accommodating chamber 54 side, and an exhaust port 57 for exhausting the air in the module accommodating chamber 54 is provided in a part of the exterior plate 52 constituting the module accommodating chamber 54.

In such the fuel cell apparatus 60, a reformed gas is efficiently generated in the reformer 1, and thereby the fuel cell apparatus 60 with high power generation efficiency may be obtained.

The invention is not limited to the examples of the above embodiments, and various changes can be made within the scope of not departing from the scope of the invention.

REFERENCE SIGNS LIST 1, 1A, 1B: Reformer
2: Reformer body
3: Vaporization portion
5: Reforming portion
5a: First reforming portion
5b: Second reforming portion
6: Ventilation wall
7: Supply port
8: Raw fuel supply pipe
9: Reformed gas delivery port
10: Reformed gas supply pipe
11, 11A, 11B: Partition wall
12: Flow permission portion
13: Water introduction portion
14: Central axis line
15: Lid
16: Outer circumferential portion of lid
17: Lid folded-back portion
20: Cell stack apparatus
21: Manifold
22: Fuel cell
23: Cell stack
24: Combustion portion
25: Inner circumferential surface
26: Outer circumferential surface
27: Convex portion
28: Rough portion
40: Fuel cell module
41: Housing
50: Exterior case
51: Support
52: Exterior plate
53: Partition plate
54: Module accommodating chamber
55: Auxiliary accommodating chamber
56: Air flow port
57: Exhaust port
60: Fuel cell apparatus
90: Outflow prevention member
91: Belt-shaped portion
92: Fixing portion

What is claimed is:

1. A reformer, comprising:
a reformer body having a cylindrical shape that is configured to carry out a reforming reaction by a raw fuel gas and water configured to be supplied thereto,
the reformer body comprising:
an inner circumferential surface,
an outer circumferential surface,
a vaporization portion configured to generate steam,
a reforming portion configured to react the steam generated in the vaporization portion with the raw fuel gas to generate a reformed gas, and
a convex portion disposed on the inner circumferential surface or the outer circumferential surface and/or a rough portion disposed on the inner circumferential surface or the outer circumferential surface;
wherein the rough portion has a higher degree of surface roughness than that of other portions of the reformer body, and
when viewed from a direction of a central axis line of the reformer body, any convex portion and/or rough portion of the reformer body are disposed only on an upper side of the central axis line of the reformer body.

2. The reformer according to claim 1, wherein
a surface of the convex portion constitutes the rough portion.

3. The reformer according to claim 1, wherein
the convex portion and/or the rough portion is disposed in the vaporization portion.

4. The reformer according to claim 1, wherein
the convex portion and/or the rough portion extend in a direction of the central axis line of the reformer body.

5. The reformer according to claim 1, wherein
the reformer body comprising the convex portion and the rough portion,
the convex portion is disposed on the inner circumferential surface,
the rough portion is disposed on the outer circumferential surface, and
the convex portion and the rough portion are disposed on opposite circumferential surfaces at a same circumferential position of the reformer body.

6. The reformer according to claim 5, wherein
the reforming portion is configured to be filled with a reforming catalyst, and
the reformer body further comprises at least one partition wall extending in a direction perpendicular to the central axis line of the reformer body.

7. The reformer according to claim 1, further comprising:
at least one partition wall extending in a direction perpendicular to the central axis line of the reformer body,
wherein the at least one partition wall is provided with an opening through which the raw fuel gas, the steam, and the reformed gas are configured to flow, and
at least one of the at least one partition wall has an opening area on a lower side of the central axis line which is larger than an opening area on the upper side of the central axis line, and
further wherein a supply port to which the raw fuel gas and water are configured to be supplied is provided at one end of the reformer body, and a reformed gas delivery port configured for delivering a reformed gas is provided at an other end of the reformer body.

8. The reformer according to claim 7, wherein
the at least one partition wall comprises a plurality of partition walls having different shapes of openings.

9. The reformer according to claim 8, wherein when viewed from the direction of the central axis line of the reformer body, the plurality of partition walls include a partition wall having an opening area on a lower side of the central axis line which is smaller than an opening area on the upper side of the central axis line, or a partition wall having an opening area on the lower side of the central axis line equal to an opening area on the upper side of the central axis line.

10. The reformer according to claim 7, wherein
the vaporization portion is located on the one end of the reformer body;
the reforming portion is located on the other end of the reformer body, wherein a reforming catalyst is housed in the reforming portion; and
the reformer further comprises an outflow preventing member configured to prevent the reforming catalyst from flowing out from the reformed gas delivery port.

11. The reformer according to claim 10, wherein
the outflow preventing member comprises:
a plurality of belt-shaped portions which are disposed at predetermined spaces from the reformed gas delivery port, and
fixing portions for fixing both ends of the plurality of belt-shaped portions to an inner surface of the reformer body.

12. The reformer according to claim 11, wherein
when viewed from the direction of the central axis line of the reformer body, an average particle diameter of the reforming catalyst located on a lower side of the central axis line of the reforming body is smaller than an average particle diameter of the reforming catalyst located on the upper side of the central axis line of the reforming body.

13. The reformer according to claim 10, wherein
when viewed from the direction of the central axis line of the reformer body, the supply port is provided at the one end of the reformer body on the upper side of the central axis line.

14. The reformer according to claim 10, wherein
when viewed from the direction of the central axis line of the reformer body, the reformed gas delivery port is disposed at the other end on a left side or a right side of the central axis line.

15. A cell stack apparatus, comprising:
a cell stack in which a plurality of fuel cells each having a columnar shape and being provided with a gas passage are electrically connected to each other and arranged in an upright state;
the reformer according to claim 1, the reformer being disposed above the cell stack;
a manifold which fixes lower ends of the plurality of fuel cells and is configured to supply the reformed gas to the plurality of fuel cells; and
a reformed gas supply pipe having one end connected to an end of the manifold and an other end connected to the reformer.

16. A fuel cell module, comprising:
the cell stack apparatus according to claim 15; and
a housing which houses the cell stack apparatus.

17. The fuel cell module according to claim 16, further comprising:
a passage wall which is disposed above the cell stack apparatus in the housing, wherein
a passage through which the gas supplied to the cell stack flows is defined by the passage wall and an inner surface of the housing, and
where D1 denotes a distance between the cell stack and the reformer body, and D2 denotes a distance between the reformer body and the passage wall, and D1>D2 is satisfied.

18. The fuel cell module according to claim 16, wherein
the vaporization portion and the reforming portion are disposed along a central axis line of the reformer body, and
where D1A denotes a distance between the cell stack and an end of the reformer body on a side where the reforming portion is disposed, and D1B denotes a distance between the cell stack and an end of the reformer body on a side where the vaporization portion is disposed, and D1A>D1B is satisfied.

19. A fuel cell apparatus, comprising:
the fuel cell module according to claim 16;
an auxiliary machine configured to operate the fuel cell module; and
an exterior case which houses the fuel cell module and the auxiliary machine.

* * * * *